United States Patent [19]

Westhoff et al.

[11] Patent Number: 4,652,252
[45] Date of Patent: Mar. 24, 1987

[54] TOOTHED BELT AND METHOD WITH REINFORCEMENT CORD

[75] Inventors: William L. Westhoff; Roger W. Dutton, both of Denver, Colo.

[73] Assignee: The Gates Rubber Company, Denver, Colo.

[21] Appl. No.: 553,615

[22] Filed: Nov. 21, 1983

[51] Int. Cl.$^4$ .............................................. F16H 1/28
[52] U.S. Cl. ..................................... 474/204; 474/267; 57/237
[58] Field of Search ............... 474/205, 204, 267, 263; 156/137, 138; 57/236, 237

[56] References Cited

U.S. PATENT DOCUMENTS

| 3,977,172 | 8/1976 | Kerawalla | 57/237 |
| 4,392,842 | 7/1983 | Skura et al. | 474/205 |
| 4,498,891 | 2/1985 | Mashimo et al. | 474/205 |

*Primary Examiner*—James A. Leppink
*Assistant Examiner*—Thuy M. Bui
*Attorney, Agent, or Firm*—H. W. Oberg, Jr.; C. H. Castleman, Jr.; Frank P. Grassler

[57] ABSTRACT

A toothed belt that has a tensile member of spirally wound cord where the operating pitch line of the belt is at least partially established by the cord which is made by twisting together at least two substantially zero twist, unequal denier yarn ends to form a ply, and twisting at least two of such plies together in the opposite direction to form the cord.

12 Claims, 6 Drawing Figures

TOOTHED BELT AND METHOD WITH REINFORCEMENT CORD

BACKGROUND OF THE INVENTION

A. Toothed Belt and Method

The invention relates to toothed belts formed with a molded, elastomeric type body, but more particularly, the invention relates to the construction and effects of a tensile member of spirally wound cord and a method for making a toothed belt in conjunction with such a tensile member.

Toothed belts with an elastomeric type body have a plurality of substantially evenly spaced, transversely oriented teeth. A wear-resistant member, usually of fabric, is oftentimes used juxtaposed along a peripheral surface that includes belt teeth and land surfaces between successive belt teeth. A tensile member of spirally wound cord is located in the body along an equatorial plane that is spaced from the land surfaces. When fabric is used, the cord is spaced from the land surfaces by the thickness of the wear-resistant fabric and the so-located cord defines the location of an operating pitch line. A common belt manufacturing problem occurs when the operating pitch line does not coincide with a design pitch line. Various tactics, short of making new molds, are used to try to make the two pitch lines coincide.

Current practice for making cord for toothed belts involves twisting equal denier yarn ends together to form a ply and then twisting several plies together in the opposite direction to form a belt cord. For example, 2, 3, 4, 5 and 6, etc., ply cords may be made. The number of plies used in the cord construction may dramatically influence the location of an operating pitch line. For example, a two ply cord may lay in the belt with either both plies flat or with one ply located above the other. When the plies are flat, the geometric offset of the cord centerline is theoretically equal to the radius of a ply whereas when the plies are stacked atop each other, a theoretical local geometric offset is equal to the diameter of one of the plies. The same general changing of the theoretical centerline of the cord occurs with three or four ply construction. A five ply construction is usually preferred because its theoretical centerline changes very little and thus, the centerline is located at a predictable center in the cord. Six ply cord construcions, while appearing to be geometrically sound, are usually unstable because one of the plies tends to migrate toward the center of the cord giving unequal ply lengths. The preferred five ply cord construction cannot always be made because yarn of the requisite material and denier may not be commercially available. When the requisite size cord is unavailable, other techniques are used to correct the operating pitch line to coincide with the design pitch line. Thicker or thinner fabric may be used for the tooth surface wear-resistant member to raise or lower the spirally wound cord in the molded belt body. The cord may be wound at various tension levels to change its effective spiral diameter and thereby affect the location of the operating pitch line.

Altering cord twist to achieve a desired cord diameter is not a satisfactory option because the amount of cord twist is established at an optimum level between high twist for good cord fatigue life and low twist for needed tensile modulus.

B. Reinforcement Cord

The invention relates to twisting textiles, but more particularly, the invention relates to a ply structure in a plied reinfoircement cord.

In some mechanical rubber goods such as belts or tires that use an embedded cord type reinforcement of twisted yarn plies, it may be important to precisely size the total cord denier and combine a specific number of yarn plies to form a cord having a desired geometry. Problems arise when available yarn deniers cannot be combined to yield a cord with a preferred total denier and preferred geometry such as that exhibiting a circular type cross section. Conversely, available yarn deniers may be combined to yield a plied cord with a desirable total denier and an undesirable ply construction, or available yarn deniers may be combined to yield a cord having a preferred geometry and an undesirable total denier. As an example, aramid type 2 continuous filament yarn as sold under the trade mark "KEVLAR 49" by duPont, is presently only available in the following six deniers: 195, 380, 1140, 1420, 2130, and 6000. Comparatively, aramid type 1 continuous filament yarn as sold under the trade mark KEVLAR or KEVLAR 29 by duPont is available in 6 deniers from 200 as follows: 200, 400, 1000, 1500, 2250, and 3000. By commercial practice, yarn having deniers of 800 and above are usually marketed to textile cord type industries and yarn having deniers below 800 are marketed to fabric type manufacturers.

Assume that it is desirable to have a two stage plied cord or aramid continuous filament yarn having a total denier of substantially 25,560. Selecting aramid type 2 yarn, the 25,560 total denier cord is made by twisting 3 ends of 1420 denier yarn together to form a ply, and then twisting 6 of such plies together in the opposite direction to form a cord. A numercial representation for designating the cord construction is "1420-3/6". While such a cord has the desired denier, it is geometrically unstable because one of the six plies tends to centrally locate at the cord center with random excursions to the cord exterior to such an extent that the plies are of apparently equal length in long cord lengths but are considerably unequal over short lengths with variances of greater than 5 percent over a 1 cm length.

A geometrically stable cord is made by twisting together three ends of 2130 denier aramid type 2 yarn together to form a ply, and then twisting four such plies together in the opposite direction to form a cord having the desired total denier of 25,560 (designated as "2130-3/4"). However, the four ply cord has somewhat of a rhombical cross section as opposed to a more circular cross section. A cord with a rhombical type cross section is geometrically undesirable because the theoretical center of the cord is not substantially equadistant from the cord sides.

A cord having a stable geometry and preferred circular type cross section where the cord center is substantially equadistant from the cord sides is made by twisting five ends of 1140 denier aramid to yarn together to form a ply and then twisting 5 of such plies together in the opposite direction to form a cord which has a total denier of 28,500 (designated as 1140-5/5). While such a cord has a preferred geometric construction, its total denier is 11.5 percent greater than the desired 25,560 denier and thus would be unsuitable as an equivalent replacement for the desired denier for some mechanical rubber goods.

Similar cords are made using aramid type 1 fiber with a goal of making a cord having a total denier of substantially 25,560. The cord is made by twisting five ends of 1000 denier yarn together to form a ply and then twisting five of such plies together in the opposite direction to form a cord having a total denier of 25,000 (designated as 1000-5/5). Such a cord has 2.2 percent less denier than desired making it unsuitable as a direct replacement for the desired denier although the cord has a preferable geometric construction.

Another aramid type 1 cord is made by twisting together three ends of 1500 denier yarn to form a ply and then twisting six of such plies together in the opposite direction to form a cord of 27,000 denier (designated as 1500-3/6). As previously explained, such a six ply cord may be unsuitable because of its geometric construction and its denier is 5.6 percent greater than that desired.

U.S. Pat. No. 3,977,172 to Kerawalla teaches an aramid composite cord construction. Dissimilar denier yarns of dissimilar materials are mixed together to form a cord for mechanical rubber goods that exhibits improved fatigue resistance and prevents wavy fabric in radial tire belts. The cord is made by twisting individually two ends of aramid type I yarn and one end of dissimilar material yarn such as nylon or polyester so that each end forms a ply and then twisting the three individual plies together in the opposite direction to form a cord. Such a three ply cord has a triangular cross section in contrast to the more desirable circular cross section. Also one of the plies introduces additional inconsistency by being of radically different material and tensile modulus than the other two plies. As recognized by Kerawalla, it is well known in the art that the ends (individual plies) should be approximately equal in size (i.e., denier) in order to obtain a balanced cord. A balanced cord is one that does not twist upon itself when released from a spool. While the Kerawalla composite cord may be satisfactory for use in tires and some ordinary mechanical rubber goods it would be unsatisfactory for toothed belts that depend upon substantially uniform tooth-to-tooth spacing. The cord property variations due to yarns of substantially different materials and tensile modulus create a cord that would introduce belt tooth pitch instabilities when the belt is operated over toothed sprockets.

SUMMARY OF THE INVENTION

A. Toothed Belt and Method

In accordance with the invention, a toothed belt of the molded, elastomeric type is provided which has a plurality of substantially evenly spaced transverse teeth. A tensile member of spirally wound cord is disposed in the body and defines an operating pitch line. The operating pitch line is at least partially established by a cord construction where at least two substantially zero twist, continuous filament, unequal denier yarn ends are twisted together to form a yarn ply. At least two of such plies of equal denier are twisted together in the opposite direction to define a cord. Under the method, the operating pitch line is capable of being changed by selection of the unequal denier yarns.

b. Reinforcement Cord

In accordance with the invention, a cord of desired denier has at least two continuous filament, substantially zero twist yarns of unequal denier twisted together to form a ply, and at least two of such equal size plies twisted together in the opposite direction to form a cord. More preferably, at least five of such equal sized plies are formed of aramid type II yarn and are twisted together in the opposite direction to form a cord.

The invention is further described by way of example with reference to the accompanying drawings, in which.

DETAILED DESCRIPTION OF TOOTHED BELT AND METHOD

Figure 1:
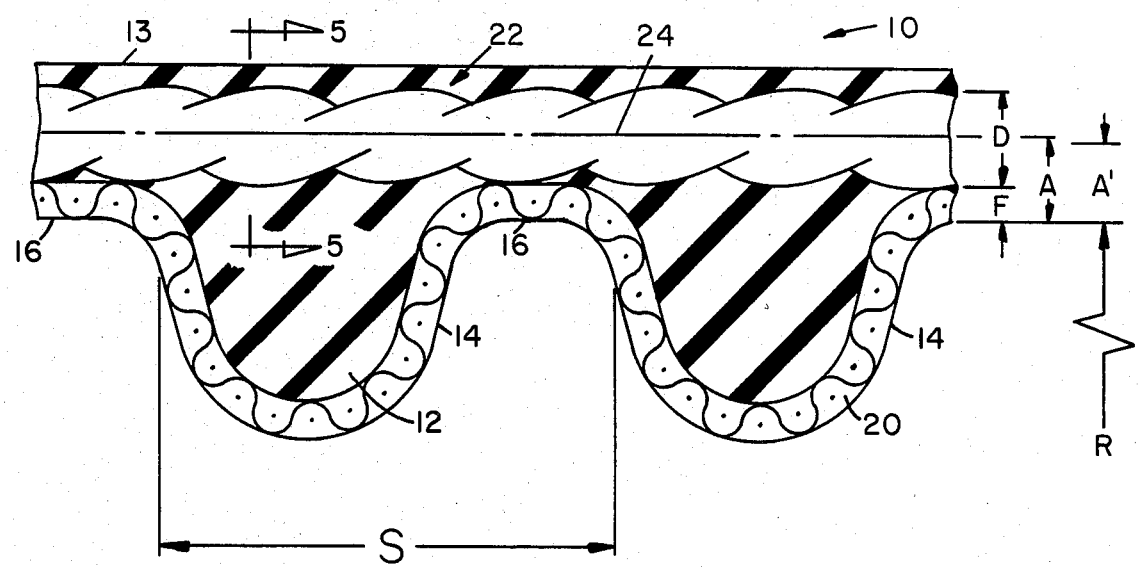
FIG. 1 is an enlarged fragmentary longitudinal cross-sectional side view of a portion of a toothed belt of the invention.
Figure 2:
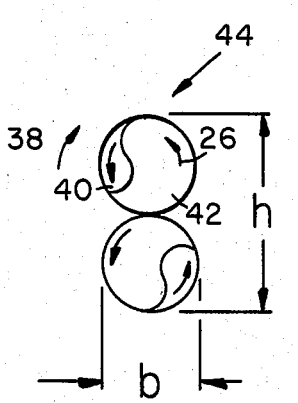
FIG. 2 is a view similar to FIG. 5 showing a two ply cord construction.
Figure 3:
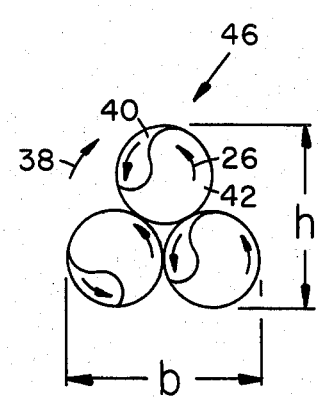
FIG. 3 is a view similar to FIG. 5 showing a three ply cord construction.
Figure 4:
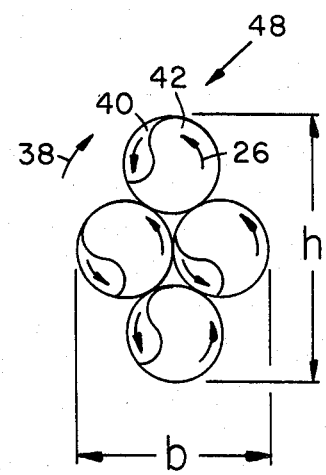
FIG. 4 is a view similar to FIG. 5 showing a four ply cord cross section.

Referring to the figures, a belt 10 of the invention is formed with a molded, elastomeric type body 12 that has a top surface 13 and a plurality of substantially evenly spaced transverse teeth 14 that are longitudinally spaced apart at a pitch S. Land surfaces 16 are formed of the body and extend between successive teeth. Various elastomers such as polyurethane, natural rubber, synthetic rubber, or blends thereof may be used to form the body.

Optionally, but preferably, a fibrous reinforcement 20 is disposed in the body along the periphery of the teeth and land surfaces as a wear-resistant member. Any suitable material may be used for the reinforcement such as a synthetic fabric of nylon or an organic fabric such as cotton.

A tensile member of spirally wound cord 22 is located in the body and defines an operating pitch line 24 that is spaced from the land surfaces a distance A. The operating pitch line 24 may substantially coincide with a design pitch line established theoretcially as being at the center of the cord having a theoretical diameter D, or the operating pitch line may be spaced a different distance A' from the land surfaces.

The location of the design pitch line is theoretically established as being spaced from the land surfaces a distance equal to the fabric thickness F plus a distance equal to ½ the cord diameter D. A belt is made with the land surfaces located at radius R. The design pitch radius for the belt is equal to R+A. When the belt bends around a sprocket, it bends around its operating pitch line and the arcuate spacing between successive belt teeth becomes shorter than the belt tooth pitch S and, by design, matches the sprocket tooth pitch. Should the belt operating pitch line be at a larger or shorter pitch radius, for illustration a shorter pitch radius R+A', the belt teeth that are in engagement with the sprocket will not properly match the sprocket tooth pitch (i.e., the spacing between belt teeth will be too long or too short in comparison to the sprocket tooth pitch) causing the belt teeth not to properly mesh with the sprocket teeth. Therefore, it becomes important to alter the location of the operating pitch line so that it substantially coincides with the design pitch line.

As previously mentioned, the location of the operating pitch line may be altered by changing the thickness F of the fabric, changing the cord denier and by winding the cord at various tension levels to either press into the fabric 20 tightly which shortens the pitch radius, or by winding the cord loosely to lengthen the pitch radius. A problem arises when the operating pitch line cannot be adjusted to coincide with a design pitch line by changing fabric thickness, or cord diameter when yarns are not available in a requisite denier.

For example, assume it is desirable to make a belt with a cord of 25,560 denier out of aramid type 2 fiber using a five ply cord construction. Aramid type 2 fiber is sold by duPont under the trade mark "Kevlar 49" and it is available only in the following deniers: 195, 380, 1140, 1420, 2130, and 6,000. While five ply cord of 25,560 cannot be made by twisting equal denier yarns, a six ply cord construction having 25,560 denier can be made by first twisting together three yarn ends of 1420 denier yarn to form a ply and then twisting six of such plies together in the opposite direction to form a cord. As previously explained, the six ply construction is undesirable because one of the plies tends to migrate to the center of the cord during the twisting operation causing variations in ply length that can lead to early cord fatigue. A four ply cord construction can be made by first twisting together three ends of 2130 denier yarn to form a ply and then twisting four of such plies together in the opposite direction to form a cord having a total denier of 25,560. As previously mentioned, a four ply cord construction, while workable in a belt, is undesirable because it may have a secondary influence on the location of the operating pitch line because of its rhombic type cross section which has large variations in its base and height dimensions.

Under one aspect of the invenion a five ply cord 22 of satisfactory denier is made by twisting 26 together two substantially zero twist, continuous filament yarn ends 28, 30 of 1420 denier and two continuous filament substantially zero twist yarn ends 32, 34 of 1140 denier to form a ply 36 and then twisting 38 five of such plies together in the opposite direction to form a cord having a total denier of 25,600 which is only 0.16 percent greater than the desired 25,560 denier. Yarns with deniers within the range of about 190 to 3,000 can be mixed in such a manner to form cords.

Figure 5:
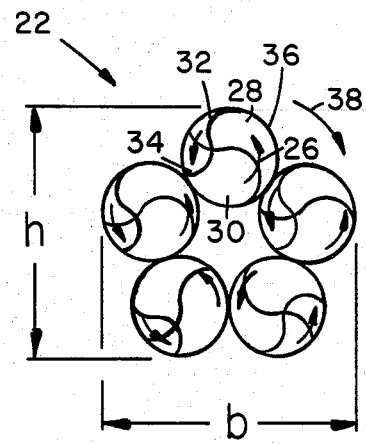
FIG. 5 is a sectional view taken along the line 5—5 of FIG. 1 showing a schematical five ply cord construction.
Figure 6:
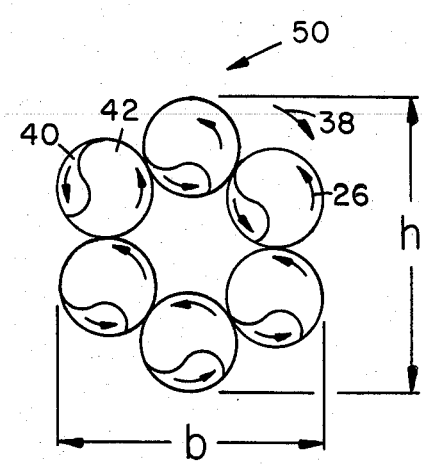
FIG. 6 is a view similar to FIG. 5 and shows a six ply cord cross section.

While the five ply cord cross section illustrated by FIG. 5 is preferred because its base b is about the same as its height h when measured from any circumferential position, FIGS. 2, 3, 4 and 6 show how unequal yarn deniers 40, 42 may be mixed together to form a cord 44, 46, 48, 50 having a desired number of plies. Note that the base b and height h of several of the constructions are unequal and therefore can induce tooth-to-tooth pitch changes in a belt by locally affecting the position of the operating pitch line.

Under the method of the invention, a toothed power transmission belt is made with an operating pitch line located at a spirally wound cord tensile member that is disposed within a molded elastomeric type belt body. A plurality of evenly spaced, transverse teeth are formed of the body with land surfaces between the successive teeth. The operating pitch line is adjusted by mixing unequal denier yarns together to form a cord of desired denier and ply construction. Adjustment is made by defining a desired pitch line in the belt body that is spaced from the land surfaces. A total cord denier can then be defined in conjunction with achieving the desired spacing of the pitch line from the land surfaces. A number of equal denier yarn plies is chosen for a desired "construction". For example, the five ply construction illustrated in FIG. 5 may be selected. At least two substantially zero twist continuous filament yarns of unequal denier may then be selected so that the sum of the chosen deniers in conjunction with the desired cord construction approximate or equal the defined total cord denier. The unequal denier yarns are twisted together to form a yarn ply and then the desired number of equal yarn plies are twisted together to form a cord. The cord may then be spirally wound to form the belt tensile member.

DETAILED DESCRIPTION OF THE REINFORCEMENT CORD

A cord of desired denier and number of plies that form a desired cord geometric cross section has at least two ends of zero twist yarn of continuous filament twisted together to form a ply, and at least two equal denier plies twisted together in the opposite direction to form a cord. It is preferred that (1) each of the yarns that are twisted together to form an individual ply have a denier within the range of about 190 to 3000 and that (2) all plies which are twisted together in the opposite direction have equal denier. Each of the plies are individually twisted in the same direction substantially the same amount and the combined ply ends are twisted together in the opposite direction to define a cord having a twist multiplier in the range of about 2 to 10. The cord may be made of any suitable high modulus fiber but preferably, the cord is made of aramid type 1 or aramid type 2 fiber. In contrast to the prior art, it has been found that unequal denier, zero twist yarn can be twisted together to form a ply and that such plies can be twisted together to form a balanced cord where there is an accepted length difference of ±2 percent difference between the lengths of yarn forming the ply, and ±2 percent difference between the lengths of plies twisted together to form the cord. The technique of mixing unequal denier, substantially zero twist yarns to form a ply permits building a cord having a desired total denier and a desired cord cross section which does not influence dimension changes in mechanical rubber goods such as tooth-to-tooth pitch in a toothed belt. Preferably, five plies are used to form a cord of substantially circular cross section. However, the invention may be used to construct a desired cord with a desired denier for cord having 2, 3, 4, and 5 plies. It could also be used for cord having 6 or more plies, but as previously mentioned, such cord may be geometrically unstable.

To illustrate how a prior art six ply cord of given denier may be replaced with a five ply cord of the invention having suitable denier, cord examples are prepared by twisting yarn on a ring type twister to form yarn plies, and then twisting together such yarn plies in the opposite direction using a "Whirlwind" type twister to form a cord. A descriptive cord property is Twist Multiplier (TM) and for the purpose of this disclosure it is calculated from the following formula:

$$TM = 0.01373 \times tpi \times (denier)^{\frac{1}{2}}$$

Wherein:
 tpi=turns per inch in the twisted yarn.
 denier=denier of yarn prior to twisting.

EXAMPLE 1

A prior art cord is prepared by twisting together three ends of 1420 denier zero twist aramid type 2 yarn to form a twisted yarn ply. Six of such plies are then twisted together in the opposite direction to form a cord having a total denier of 25,560. (1420-3/6). The details of the cord construction are tabulated in Table I.

TABLE I

|  | Yarn | Yarn Primary Bundle 3A | 6 Ply Cord Ply X Cord |
| --- | --- | --- | --- |
| Twist, turns per inch | 0 | 3.3 (Z) | 1.3 (S) |
| Tenacity gpd. | 22.5 | — | 15 (min.) |
| Denier | 1420 | 4260 | 25,560 |
| Twist Multiplier |  | 3.0 | 2.8 |
| Yarn length differential, % |  | 1 (max.) | — |
| Ply length differential, % |  | — | 2.5 (max.) |

EXAMPLE 2

A second cord of aramid type 2 fiber is prepared by simultaneously twisting together two ends of 1420 denier yarn and two ends of 1140 denier yarn to form a ply and then twisting together five of such plies together in the opposite direction to form a cord having a total denier of 25,600. Such a cord can be represented numerically as:

1420-5/5
1140-2

The details of the construction are tabulated in Table II.

TABLE II

|  | Yarn A | Yarn B | Combined yarn Bundle 2A + 2B | 5 Ply Cord Ply X Cord |
| --- | --- | --- | --- | --- |
| Twist, turns per inch | 0 | 0 | 2.8 (Z) | 1.3 (S) |
| Tenacity gpd | 22.5 | 22.5 | — | 15.0 (min.) |
| Denier | 1420 | 1140 | 5120 | 25,600 |
| Twist Multiplier | — | — | 2.7 | 2.8 |
| Yarn length differential % | — | — | 1 (max.) | — |
| Ply length differential % | — | — | — | 2.5 (max.) |

EXAMPLE 3

A third cord of aramid type 1 fiber is prepared by simultaneously twisting together three ends of substantially zero twist, 1500 denier yarn with three ends of substantially zero twist 200 denier yarn to form a ply and then twisting together five of such plies in the opposite direction to form a cord having a total denier of 25,500. Such a cord construction may be numerically represented by:

1500-3/5
200-3

The details of the cord construction are tabulated in Table III.

TABLE III

|  | Yarn B | Yarn C | Combined Yarn Bundle B + C | 5 Ply Cord Ply X Cord |
| --- | --- | --- | --- | --- |
| Twist, turns per inch | 0 | 0 | 2.8 (Z) | 1.3 (S) |
| Tenacity, gpd | 22.0 | 22.0 | — | 14.5 (min.) |
| Denier | 1500 | 200 | 5100 | 25,500 |
| Twist Multiplier | — | — | 2.7 | 2.8 |
| Yarn length differential % | — | — | 1 (max.) | — |
| Ply length differential % | — | — | — | 2 (max.) |

The acceptability of the cord of the invention was established by building and power testing toothed belts using the cords of Examples 1 and 2. The cords of Examples 2 with its 5 ply construction proved to be an acceptable substitute for the 6 ply cord construction of Example 1. Such a 5 ply construction of total denier is not achievable by using known prior art methods of twisting together substantially equal denier yarns.

The foregoing detailed description is made for purpose of illustration only and is not intended to limit the scope of the appended claims.

What is claimed is:

1. A toothed belt formed with an elastomeric type body comprising:
    a plurality of substantially evenly spaced transverse teeth;
    land surfaces formed of the body and extending between successive teeth; and
    a tensile member of spirally wound cord located in the body and defining an operating belt pitch line spaced from the land surfaces where the pitch line spacing from the land surfaces is adjustable and at least partially established by a cord construction comprising at least two substantially zero twist, continuous filament, unequal denier yarn ends twisted together and defining a yarn ply, and at least two or more said plies all of the same denier and size twisted together in the opposite direction to define a cord.

2. The belt as claimed in claim 1 wherein a wear-resistant fibrous reinforcement is disposed in the body juxtaposed along a periphery of the teeth and land surfaces.

3. The belt as claimed in claim 1 wherein five equal denier plies are twisted together to define a cord.

4. In a method for making a toothed power transmission belt with an operating pitch line located at a spirally wound cord tensile member disposed within a molded elastomeric type body having a plurality of evenly spaced transverse teeth and land surfaces between successive teeth, the improvement comprising the steps of:
    defining a desired pitch line in the belt body that is spaced from the land surfaces;
    defining a total cord denier in conjunction with achieving the spacing of the pitch line from the land surfaces;
    choosing a desired number of all equal denier yarn plies for a desired cord construction;
    selecting at least two substantialy zero twist continuous filament yarns of unequal denier so the sum of the chosen deniers in conjunction with the desired cord construction approximate or equal the defined total cord denier;
    twisting the unequal denier yarns together to form a yarn ply;
    twisting the desired number of all equal denier yarn plies together in the opposite direction to form a substantially balanced cord; and spirally winding the cord while forming and establishing a belt tensile member with an operating pitch line whose location is derived from plies of unequal denier yarns.

5. The method as claimed in claim 4 which further includes the step of selecting continuous filament yarns from a denier range of about 190 to 3,000.

6. The method as claimed in claim 4 which includes the step of selecting aramid continuous filament yarns.

7. The method as claimed in claim 4 which includes the step of selecting a five ply cord construction.

8. In a substantially balanced cord of the two stage, opposite twist ply type for reinforcing mechanical rubber goods, the improvement comprising:
   at least two substantially zero twist, continuous filament yarn ends of different denier within the range of about 190 to 3000 twisted together and defining a ply; and
   at least two or more all equal denier and size plies twisted together in the opposite direction to define a cord having a twist multiplier between about 1 and 10.

9. The cord as claimed in claim 8 wherein five plies are twisted together to define a cord.

10. The cord as claimed in claim 8 wherein the yarn is aramid fiber having a tenacity of at least about 14.5 grams per denier.

11. A toothed belt formed with an elastomeric type body comprising:
    a plurality of substantially evenly spaced transverse teeth;
    land surfaces formed of the body and extending between successive teeth; and
    a tensile member of spirally wound cord located in the body and defining an operating belt pitch line spaced from the land surfaces where the pitch line spacing from the land surfaces is adjustable and at least partially established by a cord construction comprising at least two substantially zero twist, continuous filament, unequal denier yarn ends of substantially different size twisted together and defining a yarn ply, and at least two or more said plies all of the same denier and size twisted together in the opposite direction to define a cord.

12. A toothed belt formed with an elastomeric type body comprising:
    a plurality of substantially evenly spaced transverse teeth;
    land surfaces formed of the body and extending between successive teeth; and
    a tensile member of spirally wound cord located in the body and defining an operating belt pitch line spaced from the land surfaces where the pitch line spacing from the land surfaces is adjustable and at least partially established by a cord construction comprising at least two substantially zero twist, continuous filament, unequal denier yarn ends of the same material twisted together and defining a yarn ply, and at least two or more said plies all of the same denier and size twisted together in the opposite direction to define a cord.

* * * * *